(12) United States Patent
Seavey et al.

(10) Patent No.: US 8,588,809 B2
(45) Date of Patent: Nov. 19, 2013

(54) MANAGING PUBLIC RESOURCES

(75) Inventors: Dale Seavey, Sunol, CA (US); Luis Suau, Davie, FL (US); Peter Michael Gits, Union Pier, MI (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 13/165,123

(22) Filed: Jun. 21, 2011

(65) Prior Publication Data
US 2012/0329474 A1 Dec. 27, 2012

(51) Int. Cl.
*H04M 3/00* (2006.01)
*H04N 7/18* (2006.01)

(52) U.S. Cl.
USPC ................... 455/456.1; 455/420; 725/78

(58) Field of Classification Search
USPC ......... 455/422.1, 456.1–456.5, 420; 705/412, 705/13, 34, 41; 701/201; 340/572.1; 725/78–81
See application file for complete search history.

(56) References Cited

U.S. PATENT DOCUMENTS

| | | | | |
|---|---|---|---|---|
| 6,873,258 | B2 * | 3/2005 | Marples et al. | 340/572.1 |
| 2011/0062230 | A1 * | 3/2011 | Ward et al. | 235/377 |
| 2011/0099590 | A1 * | 4/2011 | Kim et al. | 725/81 |
| 2012/0095812 | A1 * | 4/2012 | Stefik et al. | 705/13 |
| 2012/0135746 | A1 * | 5/2012 | Mohlig et al. | 455/456.1 |
| 2012/0178431 | A1 * | 7/2012 | Gold | 455/420 |
| 2012/0208521 | A1 * | 8/2012 | Hager et al. | 455/422.1 |
| 2012/0233687 | A1 * | 9/2012 | Metivier et al. | 726/16 |

OTHER PUBLICATIONS

"IPhone Opens Hotel Doors," Mar. 2, 2010, http://www.hotelnewsresource.com/article44075.html, 1 page.
"Smartphone As a Key to Room Hotel[ASSA ABLOY, The Swedish Companys Doors Open, Engaged in NFE Smartphone Enabled Door Keys],", published Dec. 30, 2010, http://digest.digestzone.com/smartphone-as-a-key-to-room-hotel-assa-abloy-the-swedish-companys-doors-open-engaged-in-nfe-smartphone-enabled-door-keys-tfts-technology-gadgets-curiosities/, 3 pages.

* cited by examiner

*Primary Examiner* — Nizar Sivji
(74) *Attorney, Agent, or Firm* — Fish & Richardson P.C.

(57) ABSTRACT

Systems and techniques relating to electronically managing public resources are described. A described technique includes identifying a location of a mobile device based on received information from one or more wireless access points communicably coupled to the mobile device; presenting to the mobile device, information descriptive of an availability of one or more facilities proximate to the mobile device, based on the identified location of the mobile device and receiving a first service request from the mobile device; receiving, from the mobile device, a second service request for provisioning a facility of the one or more facilities based on the presented information; indicating the facility to generate a signal for a provisioning confirmation; and provisioning the facility based on receiving the provisioning confirmation.

21 Claims, 5 Drawing Sheets

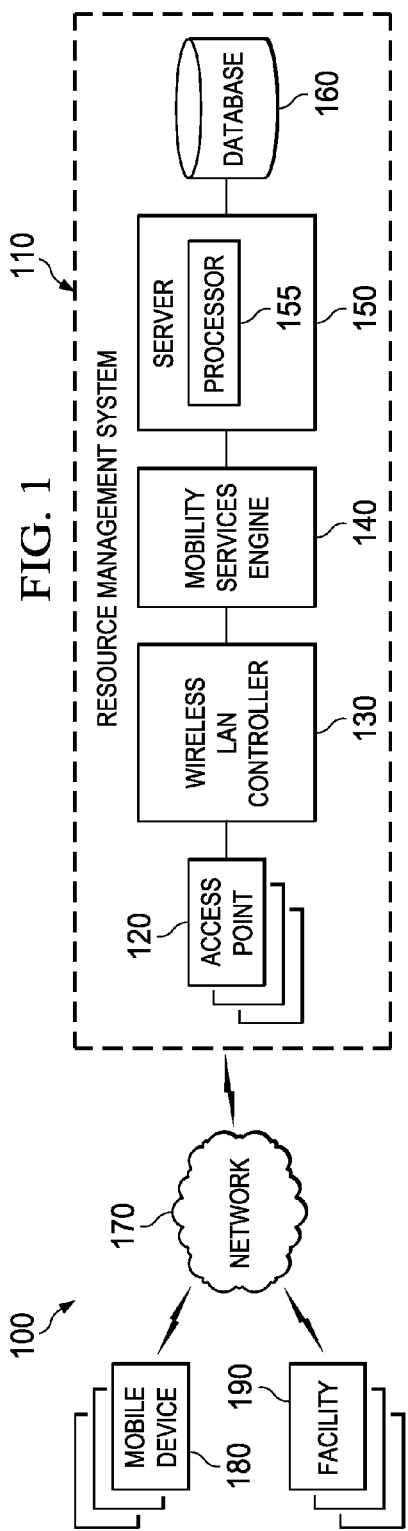
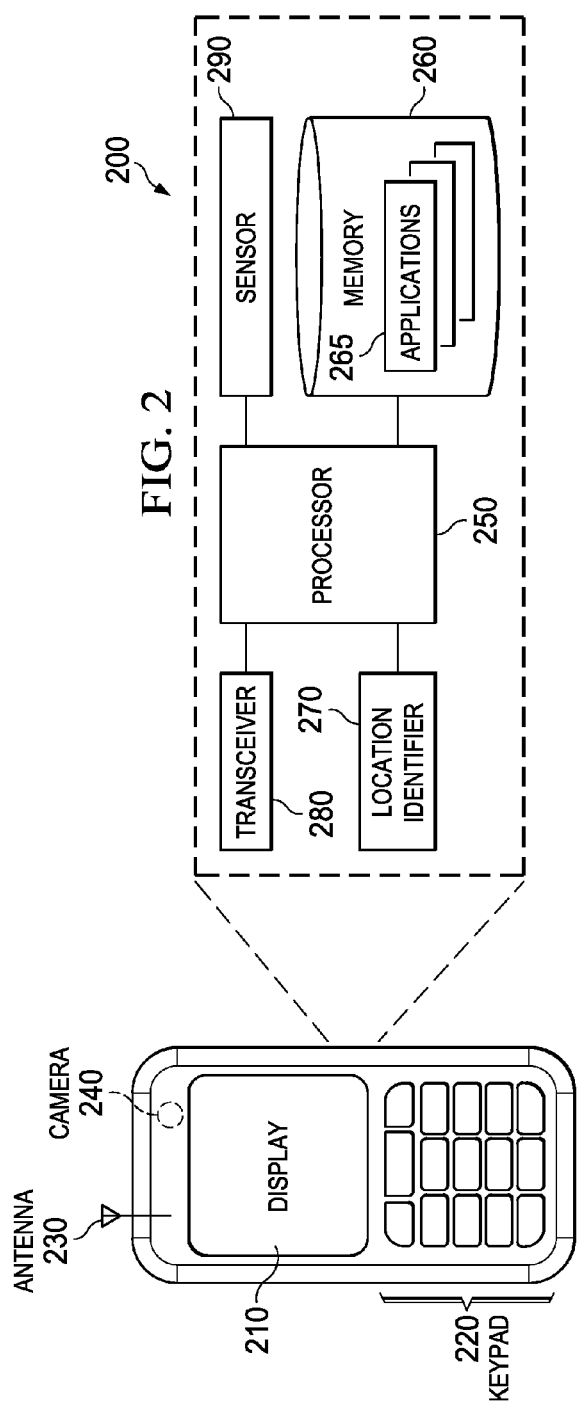

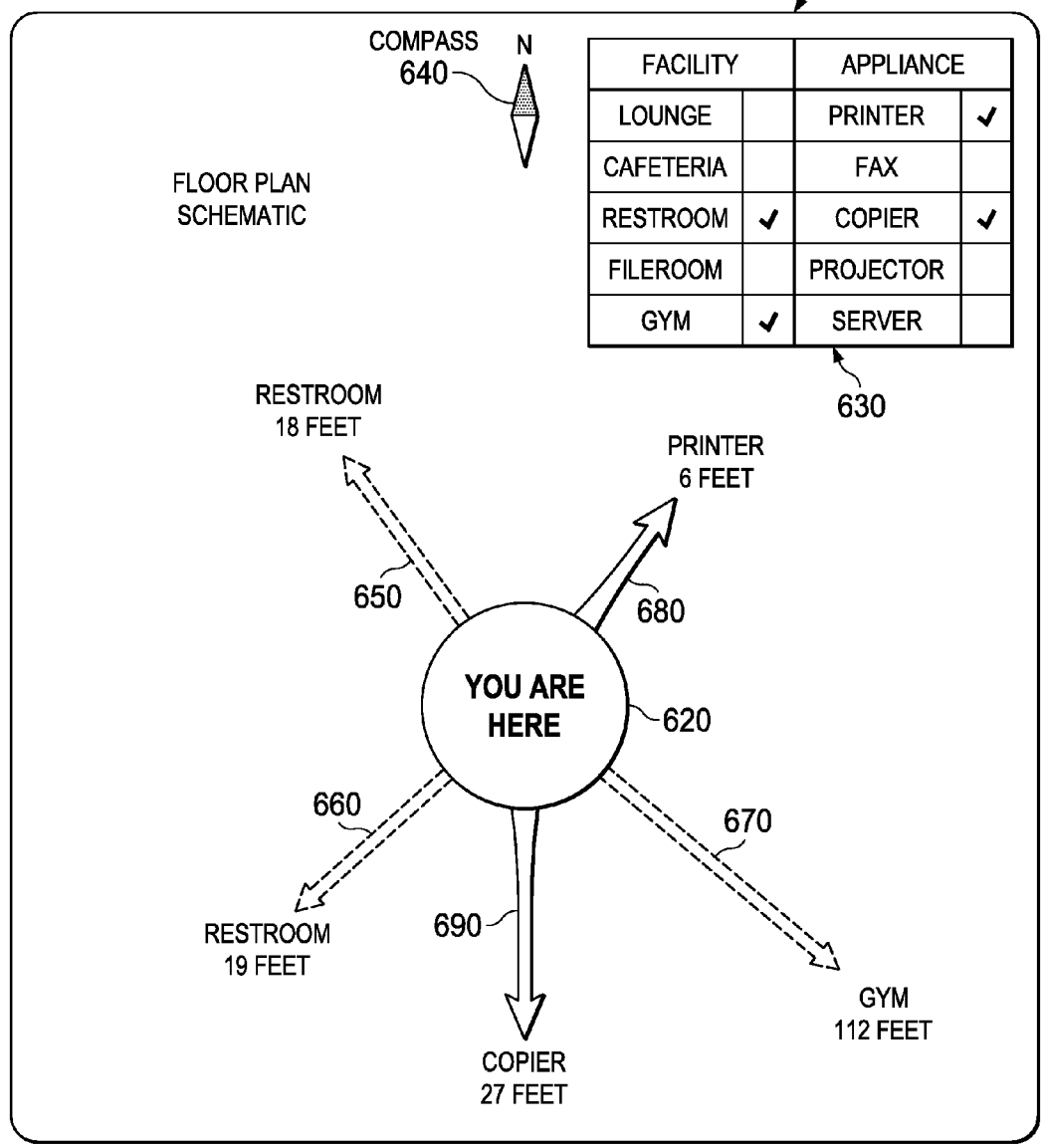

MANAGING PUBLIC RESOURCES

TECHNICAL FIELD

The following disclosure relates to electronically managing public resources.

BACKGROUND

The evolvement of mobile technologies has enabled wireless systems to provide a variety of services to mobile users. For example, wireless technologies such as wireless local area network (WLAN) technology and global system for mobile communications (GSM) technology may be used to provide services including exchanging various kinds of information between wireless terminals and infrastructure. The technology evolvement also allows mobile electronic devices, such as cell phones and personal digital assistants, to encompass a variety of features. Some example features may include navigation and image capturing.

DESCRIPTION OF FIGURES

FIG. 1 is a schematic representation of an example environment for providing facility provisioning services.

FIG. 2 is a schematic illustrating an architecture of an example mobile device.

FIG. 6 is a schematic illustrating an example display screen of a mobile device displaying location information of facilities and appliances proximate to a provisioned facility.

DESCRIPTION OF EXAMPLE EMBODIMENTS

Overview

Figure 3:
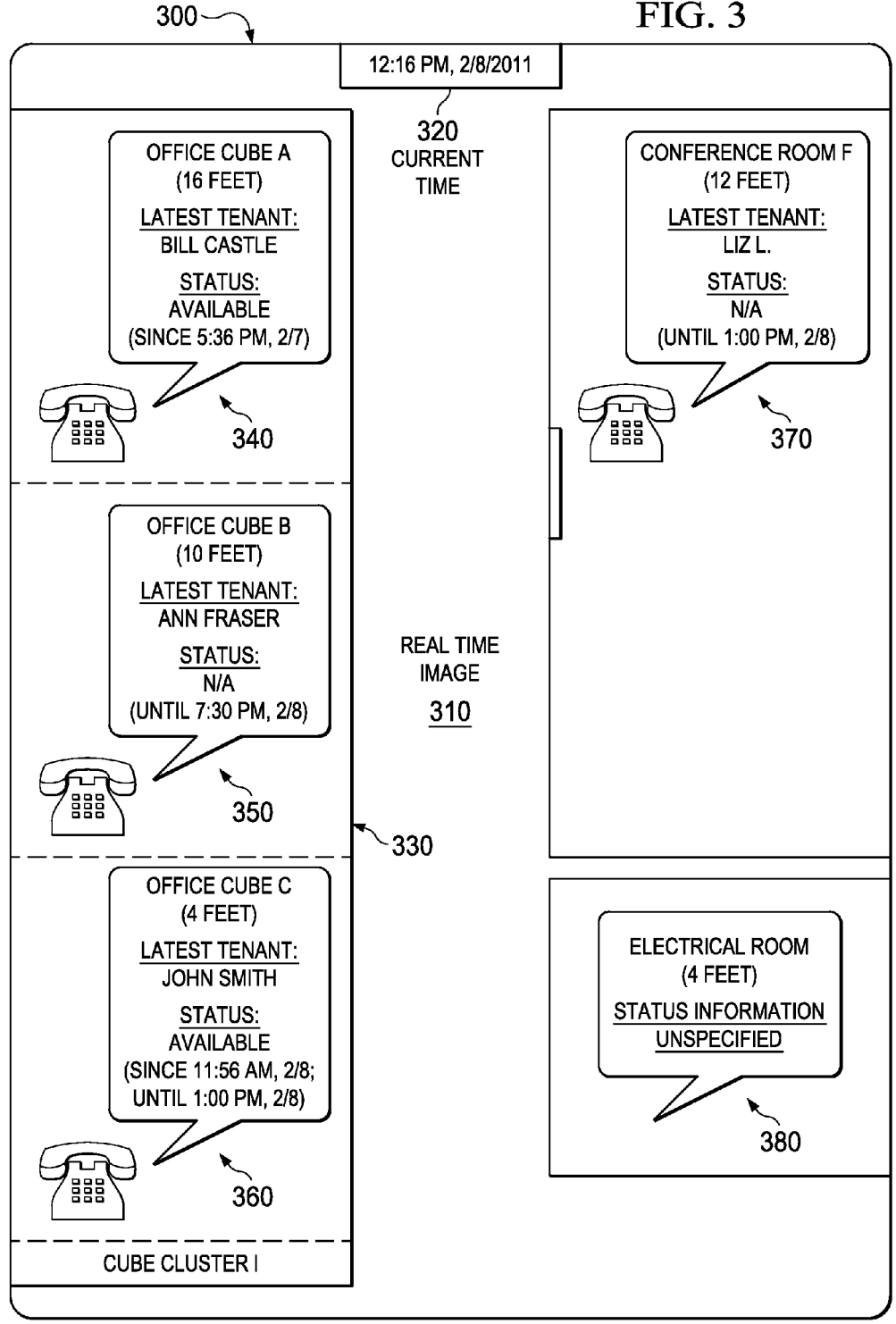
FIG. 3 is a schematic illustrating an example display screen of a mobile device displaying facility availability information as an overlay of a real time image.

This disclosure provides descriptions of various configurations of systems, apparatus and methods for managing public resources. In some configurations, managing public resources may generally include one or more of the following features. A location of a mobile device is identified based on receiving information from one or more wireless access points communicably coupled to the mobile device. Based on the identified location of the mobile device and receiving a first service request from the mobile device, information descriptive of an availability of one or more facilities proximate to the mobile device is presented to the mobile device. A second service request, based on the presented information is then received from the mobile device for provisioning a facility of the one or more facilities. The facility is indicated to generate a signal for a provisioning confirmation in response to the second service request. The facility is provisioned based on receiving the provisioning confirmation.

Detailed Description

Wireless technologies may be implemented on electronic products, networks, systems and infrastructure to enable a variety of services that may be provided to wireless mobile users. In some implementations, services may be accessible through and based upon on wireless technologies. Wireless devices may be used to manage public resources. Example public resources that may be managed by using wireless technologies may include public facilities, office appliances, electronic devices and energy. In some instances, public resources may be informed, prepared and/or released for a certain mobile user in response to requests sent by the mobile user. For example, in an indoor office environment, a wireless system may be configured to provide customized office resource allocation services based on service request(s) sent from mobile users. A mobile user may request an office resource, e.g., an office cubicle to be used for work. The mobile user may first send a service request to check for the available office cubicles within the office environment. The wireless system may identify the current location of the mobile user based on at least one wireless networking technology, e.g., a Wi-Fi technology. Based on the identified location of the mobile user, the wireless system may present to the mobile user, information regarding at least one office cubicle that is proximate to the current location of the mobile user. The information may include availability status, available time and current/former occupant. Available office cubicles may be the cubicles that are temporarily not in use. Therefore, the available office cubicles may be powered down in order to save power. The mobile user may walk to an available office cubicle based on the presented availability information, and request the wireless system for provisioning the office cubicle by moving a mobile device, e.g., a smart phone, that is pointing towards the office cubicle. The mobile device may be Wi-Fi enabled and equipped with a sensor that may sense the movement and/or orientation of the device. Based on receiving information descriptive of the movement and/or orientation of the mobile device, the wireless system may confirm with the mobile user the particular office cubicle that the mobile user wants to be provisioned, by indicating to ring a phone (e.g., an IP phone) that is associated with the office cubicle. The user may confirm and register with the office cubicle by picking up the phone. The wireless system may then send instructions via a wired and/or wireless network for provisioning the office cubicle. Provisioning the office cubicle may include powering up the phone (e.g., a Private Branch Exchange (PBX) or an IP phone), the light, the computer and registering the mobile user to the office cubicle. After provisioning the office cubicle, the wireless system may update the office cubicle allocation information stored in a database included in the wireless system. The wireless system may also present location information of one or more facilities and/or office appliances (e.g., a printer, a break room) proximate to the provisioned office cubicle based on a request from the mobile user. The mobile user may release the office resource after the individual's use has ended by sending another service request. A determination that the use has ended may be made by detecting the conclusion of a reserved time period or timer, determining that the user has left the immediate local, and/or receiving an explicitly released request transmitted by the user. Releasing the office resource may include powering of the provisioned electronic devices associated with the office cubicle and signing out the mobile user. In one configuration, releasing the office resource may be done by moving the mobile device pointing towards the office cubicle again. A usage log may be generated by the wireless system to record an identity of the user, time, energy consumption and/or any other usage information related to the office cubicle. The information included in the usage log may be presented to other authorized mobile users within the office environment based on request(s).

FIG. 1 is a schematic representation of an example environment 100 for providing facility provisioning service. The example environment 100 in FIG. 1 includes four high-level components, a wireless resource management system 110, a network 170, one or more mobile devices 180 and one or more facilities 190.

In the example implementation illustrated in FIG. 1, the wireless resource management system 110 includes one or more wireless access points 120, a wireless local area network (WLAN) controller 130, a mobile services engine (MSE) 140, a server 150 and a database 160. In some implementations, a wireless resource management system 110 may include additional and/or different features, components and/or subsystems. At a high level, the wireless resource management system 110 may provide services including locating mobile/fixed electronic devices, objects, facilities, transmitting, receiving and/or processing signals associated with physical locations, electronic devices, objects and/or facilities.

An access point 120 is an electronic device that may allow mobile devices 180 to connect to a wired network using Wi-Fi, Bluetooth, WiMAX or related standards. In some implementations, wireless access point 120 may be connected to a router (via a wired network), and may relay data between the mobile devices 180 and wired devices on the network 170. In general, wireless access point 120 may act as a bridge, router, and/or a client in a wireless resource management system 110. Wireless access points 120 may also be in communication with one or more WLAN controllers 130. WLAN controller 130 may be used to manage one or more access points 120. The wireless LAN controller 130 may be part of a data plane within a wireless system model (e.g., Cisco wireless model). The WLAN controller 130 may be used to automatically handle the configuration of wireless access-points 120, depending on the wireless system model. In some implementations, WLAN controller 130 may further be configured for communication with a mobility services engine (MSE) 140 (e.g., Cisco MSE). The MSE may be an appliance-based unit that supports wireless services to provide centralized and scalable service delivery including location services.

The illustrated example wireless resource management system 110 includes a server 150. At a high level, the server 150 may include electronic computing device(s) operable to receive, transmit, process, store, or manage data and signal associated with the example environment 100. Specifically, the server 150 illustrated in FIG. 1 may be responsible for processing signals bearing one or more kinds of information received from a mobile device 180 including information descriptive of movement of the mobile device, distance information, time information, range information and address information. The server 150 may also be responsible for processing information received from access point 120, WLAN controller 130 and MSE 140 including information associating with identifying location information of mobile devices 180, monitoring information associated with the operation mode of the mobile devices 180. The server may also store one or more applications and process the one or more applications for providing services to mobile devices 180 operating in the environment 100 through network(s) 170. The server may be communicably coupled to the WLAN controller 130, MSE 140 and a database 160. In general, the server 150 includes a server that is configured to host one or more applications, where at least a portion of the hosted applications are executed via requests and responses sent to mobile devices 180 or clients within and communicably coupled to the illustrated environment 100 of FIG. 1. In some instances, the server 150 may store a plurality of various hosted applications, while in other instances, the server 150 may include a dedicated server meant to store and execute only a single hosted application. In some instances, the server 150 may include a web server, where the hosted applications represent one or more web-based applications accessed and executed via network 120 by the mobile devices 180 of the environment 100 to perform the programmed tasks or operations of the hosted application. Although FIG. 1 illustrates a single server 150, the example environment 100 may be implemented using two or more servers 150, as well as computers other than servers, including a server pool. Indeed, server 150 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 150 may be adapted to execute any operating system, including Linux, UNIX, Windows, Mac OS, or any other suitable operating system.

The server may include a processor 155. Although illustrated as a single processor 155 in FIG. 1, two or more processors may be used according to particular needs, desires, or particular implementations of the server. Generally, a processor 155 may receive instructions and data from a read only memory or a random access memory or both. The essential elements of a server 150 may include a processor 155 for performing instructions and one or more memory devices for storing instructions and data. In some instances, the instructions and data may be stored in a database 160 external to the server 150. Generally, a server 150 may also include, or be operatively coupled to receive data from or transfer data to, or both, one or more mass storage devices for storing data, e.g., magnetic, magneto optical disks, or optical disks. The storage device may include a non-transitory medium. Each processor 155 may include a central processing unit (CPU), a blade, an application specific integrated circuit (ASIC), a field-programmable gate array (FPGA), or another suitable component. The functions of the processor 155 may also include computation, queue management, control processing, graphic acceleration, video decoding, and execution of a sequence of stored instructions from the program kept in the memory or database 160. In some implementations, the processor 155 may also be responsible for signal processing including sampling, quantizing, encoding/decoding, and/or modulation/demodulation of the signal.

The server 150 may also be communicably coupled to a database 160. In general, the database 160 may be a system used to organize, store, and/or retrieve data. Database 160 may include an organized collection of data for one or more uses, typically in digital form. Data stored in the database 160 may be managed by the server 150. In some instances, server 150 may store database contents, allowing data creation and maintenance, and search and other access. In some implementations, database 160 may store location information. For example, the data stored in the database 160 may contain information associated with location of rooms, equipment, etc., the information in some instances, may be identified by a mobile device 180 located in the room or on the equipment, or may be identified by other means and stored in the database 160. For example, a Wi-Fi enabled electronic device (e.g., an access point 120) may be located in the room to provide location information. In an enterprise environment, specified locations (e.g., conference rooms) may be mapped out within an office building or complex. Each conference room may be measured based on a reading between an access point and the edges of the conference room and mapped out and tagged with coordinates. This may eliminate the need for a mobile device 180 to identify a fixed location. The stored measurements may also be updated or corrected.

In one implementation, the information stored in the database may include floor plans of a building, a venue or any other kinds of constructions. The wireless resource management system 110 may use radio frequency (RF) fingerprinting to locate facilities and/or users based on the stored floor plans. The server 150 may perform an RF prediction that may be used to create a grid mapped to a floor plan that includes physical characteristics and access points 120 in a given area. For finer accuracy, actual measurements and a calibration may be taken by the wireless resource management system 110. With RF fingerprinting, real-time data regarding physical objects locations in a given area is gathered by access points 120. The RF fingerprinting may be gathered based on a location identifier (e.g., an RFID) included in each of the mobile devices 180, objects and/or the facilities in the given area. The RF real-time data may be compared to the grid to determine the mobile device's 180 location relative to the facilities in proximity. With RF fingerprinting, the server 150 uses the information that it receives from the access points 120 and matches it against the database 160 of location fingerprints. The database that includes RF fingerprinting may take into account the floor plan of the architecture as well as path-loss attenuation, shadowing effect, multi-path fading effect and/or mobility of the mobile device 180. The wireless resource management system 110 may also use triangulation to identify the location of the mobile device 180. Triangulation may use multiple access points 120 to locate the mobile device 180 based on the received signal strength of the device at each access point 120. Using algorithms, the server 150 may determine the intersection point of the mobile device's 180 signal at each access point 120 to identify the mobile device's most likely location. The server 150 may also use a closest access point method to find mobile devices 180 within the total coverage area of a single access point 120. In some instances, the wireless resource management system 110 may use signal timing to identify the location of the mobile device 180. For example, one or more of the access points 120 may each identify a signal propagation time from the mobile device 180 to the particular access point 120, and a relative distance between the mobile device 180 and the particular access point 120 based on the signal propagation time. The wireless resource management system 110 may then identify the physical location of the mobile device 180 based on the determined relative distances and location data of the one or more access points 120.

The location of the mobile device 180 or other mobile devices may be identified at regular predefined intervals or at the occurrence of an event (e.g., application activated, movement of the wireless device). In some instances, the location data may be sent to the database 160 communicably coupled to the server 150, along with a time stamp corresponding to when the wireless device was at the location. The location of rooms, equipment, or other facilities may be identified by a mobile device 180 located in the room, on the equipment, in the facilities, or may be identified by other means and stored in the database 160. For example, a Wi-Fi enabled device may be located in the room to provide location information. In an enterprise environment, specified locations (e.g., an office cubicle) may be mapped out within an office building or complex. Each conference room may be measured based on a reading between an access point 120 and the edges of the office cubicle and mapped out and tagged with coordinates. This would reduce the workload for a mobile device 180 to identify a fixed facility. The stored measurements may also be updated or corrected by the server 160.

In the illustrated example environment 100, the communications between the mobile devices 180 and the wireless resource management system 110 are through a network 170. Generally, the network 170 facilitates wireless communications between the mobile devices 180 operated in the environment 100, as well as with any other local or remote electronic devices 180 communicably coupled to the network 170 but not illustrated in FIG. 1. The network 170 is illustrated as a single network in FIG. 1, but may be a continuous or discontinuous network without departing from the scope of this disclosure, so long as at least a portion of the network may facilitate communications between senders and recipients. The network 170 may include all or a portion of an enterprise or secured network, while in another instance at least a portion of the network 170 may represent a connection to the Internet. In some instances, a portion of the network 170 may be a virtual private network (VPN), such as, for example, the connection between the mobile device 180 and the server 130. Further, all or a portion of the network 170 may include wireless links. Example wireless links may include 802.11a/b/g/n, 802.20, WiMAX, Bluetooth and/or any other appropriate wireless link. In other words, the network 170 may encompass an internal or external network, networks, sub-network, or combination thereof operable to facilitate communications between various computing components inside and outside the illustrated environment. The network 170 may communicate, for example, Internet Protocol (IP) packets, Frame Relay frames, Asynchronous Transfer Mode (ATM) cells, voice, video, data, and other suitable information between network addresses. The network 170 may also include one or more local area networks (LANs), radio access networks (RANs), metropolitan area networks (MANs), wide area networks (WANs), all or a portion of the Internet, and/or any other communication system or systems at one or more locations.

The wireless resource management system 110 may be used to provide service(s) to one or more mobile devices 180. A mobile device 180 may include a computing device operable to connect to or communicate with the wireless resource management system 110 and the network 170 using wireless connections. In general, a mobile device 180 may include an electronic computing device operable to receive, transmit, process, and store any appropriate data associated with the environment 100 of FIG. 1. It will be understood that there may be a number of mobile devices 180 associated with, or external to, the example environment 100. For example, while illustrated environment 100 includes two mobile devices 180, alternative implementations of wireless environment 100 may include a plurality of mobile devices communicably coupled to the network 170 and wireless resource management system 110 to the purposes of the environment 100. Additionally, there may also be one or more additional mobile devices 180 external to the illustrated portion of environment 100 that are capable of interacting with the wireless resource management system 110 via the network 170. Further, the term "mobile device" and "mobile user" may be used interchangeably as appropriate without departing from the scope of this disclosure. Moreover, while each mobile device 180 is described in terms of being used by a single user, this disclosure contemplates that many users may use one user device, or that one user may use multiple user devices. In some implementations, the mobile device 180 may include a mobile device used by an end-user to communicate information using radio technology and performing a plurality of computing tasks. Mobile device 180 may also be referred to as mobile electronic device, user device, mobile station, subscriber station, or wireless terminal. A mobile device 180 may be a cellular phone, personal data assistant (PDA), smartphone, laptop, tablet personal computer (PC), Session Initiation Protocol (SIP) phones, touch screen terminal, or any other suitable wireless communication devices capable of performing a plurality of tasks including communicating information using a radio technology.

The wireless resource management system 110 may manage the resources of one or more facilities 190. The facility 190 may be a workspace, an office cubicle, a laboratory, a conference room, or any other facilities that are suitable for the example environment 100. The facility 190 may be equipped with one or more electronic devices and/or office supplies. Example electronic devices equipped in the office may include telephone (e.g., an IP phone), lights, computer and experimental instruments. The electronic devices may be connected to an electrical source though power cords and a network 180 through wireline or wireless communications. The electronic devices may be in a sleep mode or an off mode when not been used. The wireless resource management system 110 may be configured to power up the electronic devices by sending wireless and/or wireline signals directly to at least one of the electronic devices, or communicate with a power management device that is in control of the power associated with the electronic devices.

FIG. 2 is a schematic illustrating an architecture 200 of an example mobile device. In the illustrated example, the hardware components of the mobile device includes a display 210, a keypad 220, one or more antennas 230, one or more cameras 240, a processor 250, a memory, a location identifier 270, a transceiver 280 and a sensor 290. The display is an output device for presentation of information in visual or tactile form in response to electronic input signals. In some implementations, the display may be a touchscreen, which is an electronic visual display that may detect the presence and location of a touch within the display area. The term, touchscreen, may generally refer to touching the display of the device with a finger or hand. Touchscreens may also sense other passive objects, such as a stylus. The display 210 may be used to display location related information, real-time view of the environment, mobile user identity and any other appropriate information without departing from the scope of the disclosure. The keypad 220 is an input unit of the mobile device. A keypad may include multiple keys (not shown) arranged in a block, which includes numerical keys, alphabetic keys, standard telephone keys, or any other icons or symbols. In some implementations, the keypad 220 may also be shown on a touchscreen, which may be integrated with the display 210. The keypad 220 may be used to type in a specific element (e.g., room, equipment, person, facility) to locate, type a message for display or type in information relating to the message viewing restrictions. The mobile device is also equipped with at least one antenna 230. The at least one antenna 230 may be internal or external of the mobile device. The antenna 230 is a transducer which may transmit and/or receive electromagnetic waves. Antenna 230 converts electromagnetic radiation into electric current, or vice versa. Antenna 230 is generally responsible for the transmission and reception of radio waves, and may serve as the interface between the transceiver 280 and the wireless channel. In some implementations, multiple antennas 230 may be included in the mobile device to enable multiple-input-multiple-output (MIMO) technology for increasing transmission rate and/or reliability. One or more cameras 240 also may be included in the mobile device. Cameras 240 may be used to record images. The images recorded by camera 240 may be a still image or moving images such as movies or videos. The one or more cameras 240 may also be used to capture real-time images that may be displayed on the display instantaneously. Each of the one or more cameras 240 may also include an optical sensor (not shown). The optical sensor may be a charge-coupled device, complementary metal-oxide semiconductor (CMOS), or any other suitable device. The optical sensor receives light projected through one or more lenses and converts the light to data representing an image. The mobile device may include any number of other user interfaces (not shown) such as one or more manual buttons (e.g., switches). The mobile user may select and activate the applications by touching the touchscreen or pressing one or more buttons. The mobile device may also include one or more speakers and one or more microphones (not shown).

As illustrated in FIG. 2, a mobile device includes a processor 250. Although illustrated as a single processor 250 in FIG. 2, two or more processors may be used according to particular needs, desires, or particular configurations of the mobile device architecture 200. Generally, the processor 250 executes instructions and manipulates data to perform the operations of the mobile device and, specifically, the one or more plurality of applications 265 stored in memory 260. The processor 250 may also include functionalities substantially similar to the functionalities of the processor 155 included in the server 150 as illustrated in FIG. 1.

Memory 260 may include any memory or database module and may take the form of volatile or non-volatile memory including, without limitation, magnetic media, optical media, random access memory (RAM), read-only memory (ROM), removable media, or any other suitable local or remote memory component. Memory 260 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the mobile device and its one or more applications 265. At a high level, each of the one or more applications 265 is any application, program, module, process, or other software that may execute, change, delete, generate, or otherwise manage information according to the present disclosure, particularly in response to and in connection with one or more location-based message delivering service. In certain cases, only one application 265 may be located at a particular mobile device. In others, a plurality of related and/or unrelated applications 265 may be stored at a single mobile device. Additionally, any or all of the applications 265 may be a child or sub-module of another software module or application without departing from the scope of this disclosure.

The wireless transceivers 280 may include both the transmitter circuitry and the receiver circuitry. The wireless transceivers 280 may be responsible for up-converting a baseband signal to a passband signal or vice versa. The components of wireless transceivers 280 may include a digital to analog converter/analog to digital converter, amplifier, frequency filter and oscillator. The wireless signals transmitted or received by the antenna 280 may be directly before/after processed by the transceivers 280.

The location identifier 270 may be used for assisting the wireless resource management system to determine the position and/or identity of the mobile device. In some instances, the location identifier 270 may include proximity sensor, optical sensor, magnetometer, compass, RFID, wireless sensor, or any other device configured to determine the position and/or identity of the mobile device. The location identifier 270 may be used in combination with one or more components of the wireless resource management system to identify the location of the mobile device or may store information received from the wireless resource management system indicating the location of the mobile device.

The illustrated mobile device architecture also includes a sensor 290. The sensor 290 may be used for the detection of different manual manipulation, including, for example, orientation, motion, tilt, etc. The sensor 290 may include, for example, a motion detector, accelerometer, gravity meter, gyroscope, etc. In some instances, the sensor 290 determines the orientation of the device (e.g., horizontal, vertical) based on analysis of data received from one or more accelerometers. The accelerometer may detect movement of the mobile device along any axis (e.g., horizontal, vertical) or any combination of planes (e.g., three dimensional movement).

It is to be understood that the mobile device shown in FIG. 2 and described herein is an example of a mobile device, and that the device may have additional, fewer or different components or a different arrangement or configuration of components, without departing from the scope of the disclosure. The mobile device may be configured to operate in different modes based on the position and/or user of the mobile device. In some implementations, when the mobile device is held in a generally flat, horizontal position, directions to facilities are displayed with distance information (FIG. 6) as an overlay of a floor plan image of the building that the facilities are located in. If the mobile device is tilted upwards (towards a generally vertical position), the environment are displayed in the real time view with overlays displaying identity, distance, occupant, and availability information associated with each one of the proximate facilities as digital graffiti (FIG. 3). If the mobile device is tilted further up, additional digital graffiti associated with facilities appear indicating facilities that are farther away from the mobile device.

FIG. 3 is a schematic illustrating an example display screen 300 of a mobile device displaying facility availability information as an overlay of a real time image. The illustrated example user interface 300 is a graphic user interface which may be presented on the display of a mobile device. The mobile device may be a mobile device operating in the illustrated example environment 100 shown in FIG. 1. The user interface 300 may be presented on the mobile device based on a service request for using public resource sent from the mobile device. The user interface 300 may be a user interface of a mobile device application. In some instances, the application may include an augmented reality application. The augmented reality application may be used to display information based on augmented reality. Augmented reality may be a live, direct or indirect view of a physical, real-world environment, in which one or more elements may be augmented by electronically generated input, such as graphics or texts. In some instances, the view of reality may be modified by the augmented reality application. As a result, the augmented reality application may function by enhancing the mobile user's current perception of reality, such as presenting messages or graffiti as overlays of the real-time environment. In the particular example illustrated in FIG. 3, when the mobile device application is executed, a real-time live image 310 captured by a camera of the mobile device may be presented on the user interface 300, and a request for public resource may be automatically generated and sent to the resource management system by the mobile device. After the request is received by the resource management system, graphical elements associated with facility availability information may be presented on the user interface 300 by augmented reality.

In the example user interface 300, the associated facility availability information is presented as graphical elements of the real time image 310 of the environment. Each graphical element may be presented in an overlay mode, that is, on top of its associated facility in the real time image 310, illustrative of their association. A current time 320 is shown on the user interface 300. The current time 320 may be used as a reference to identify availability of facilities associated with time. In the particular illustrated example 300, the current time 320 is shown as "12:16 PM, Feb. 8, 2011". Facilities captured in the live image 310 include: (1) a cube cluster I 330, including office A 340, office B 350, office C 360, (2) conference room F 370, and (3) an electrical room 380. A graphical element may be presented as overlay for each of the facilities. The information include in the graphical element includes, the identity of the facility (e.g., an office), the distance to the facility from the current position of the mobile device, the latest tenant of the facility and the current availability status of the facility. In the illustrated implementation 300, the graphical element associated with office cube A 340 shows that office A is 16 feet away from the mobile device, the latest tenant's name is "Bill Castle" and office cube A is available since 5:36 PM, February 7. There is no end time specified, which may mean that no one else has reserved office cube A yet until the current time 320. The available time may be automatically generated by resource management system when Bill Castle finished using office cube A and requested to power it off. The graphical element associates with office cube B 350 shows that office cube B is 10 feet away from the mobile device, the latest tenant's name is "Ann Fraser" and office B is not available until 7:30, February 8, which may mean that office cube B is allocated to Ann Fraser until 7:30 PM, February 8, based on her request. The graphical element associated with office cube C 360 shows that office cube C is 4 feet away from the mobile device, the latest tenant's name is John Smith and office cube C is available from 11:56 AM to 1:00 PM, February 8. The start and end of the available period may be specified by John Smith. John Smith may have requested the resource management system to power off office cube C at 11:56 AM, February 8 and reserved it for use again from 1:00 PM. The graphical element associated with conference room F shows that conference room F is 12 feet away from the mobile device, the latest tenant's name is Liz L. The conference room may be used by more than one person, however, Liz L. may be the user who made the reserve request. Conference room F is shown as not available until 1:00 PM, February 8. There may be other facilities, such as the electrical room 380, registered to the resource management system, but is not available to be used by the user of the mobile device. Thus, only the distance information (i.e., 4 feet) is shown on the mobile device, the availability information is shown as "status information unspecified". Based on the information shown in the graphical element, the user of the mobile device may identify that both office cube A and office cube C are available for use at the current moment, the user may choose either of them based on needs.

Figure 4:
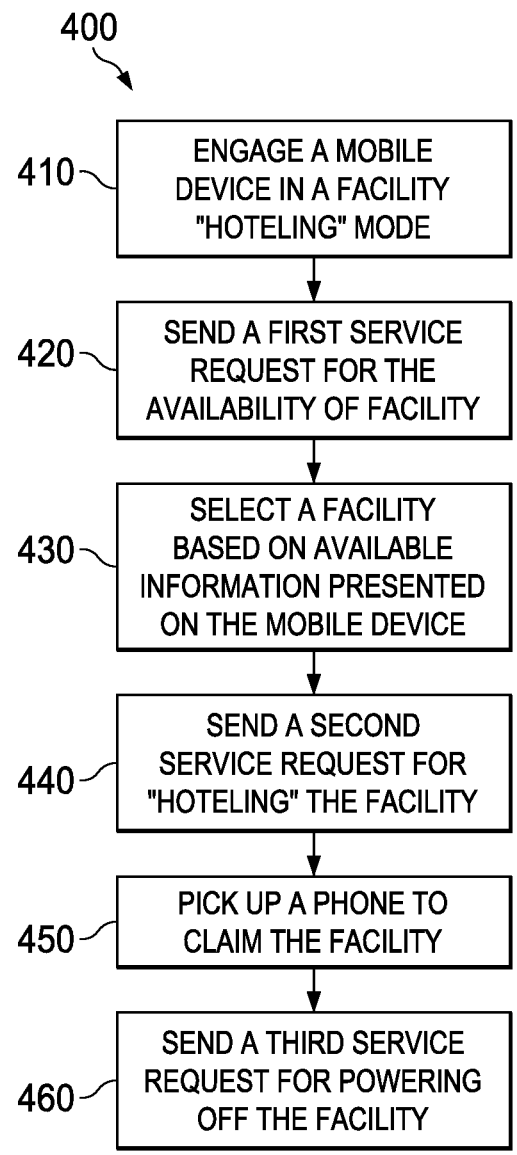
FIG. 4 is a flowchart of a process by which a user may provision services as the user hotels within a facility from a mobile device.

FIG. 4 is a flowchart 400 of a process by which a user may provision services as the user hotels within a facility from a mobile device. Generally, the operations shown in flow chart 400 may be performed using the system configurations described previously. At 410, the mobile device may engage in a facility "hoteling" mode. The facility "hoteling" mode may be a mode that the mobile device user requests a facility to be provisioned for use. The mobile device may engage in a facility "hoteling" mode by opening a mobile device application, such as the application described in the illustration of FIG. 3.

At 420, a first service request is sent to inquire about the availability of facility. In some implementations, the first service request may be automatically sent to the resource management system when the mobile device is engaged in a facility "hoteling" mode at 410. In some implementations, the first service request may be sent by selecting from the user interface of the mobile device.

At 430, a facility is selected based on availability information presented on the mobile device. Availability information associated with facilities may be managed by the resource allocation system using methods as described in the illustration of FIG. 1. The availability information may be presented to the mobile user using a user interface such as the user interface 300 illustrated in FIG. 3. Available facilities may be the facilities that do not have any current user. In some implementations, the available facilities may be powered down before they are provisioned in order to save power. Based on the availability information, the mobile device user may select an available facility by pressing the display screen of the mobile device if the mobile device has a touchscreen or make the selection using a keypad or push button(s) included in the mobile device. In some implementations, the mobile device may include a sensor, such as the sensor 290 described in the illustration of FIG. 2. The mobile device user may approach the facility he/she wants to be provisioned and "wand" the phone towards the facility to select the facility. In some instances, the mobile device user may engage the mobile device in a facility selection mode by pressing the screen or a button of the mobile device while "wanding" the mobile device towards the facility.

At 440, a second service request for "hoteling" the facility is sent. The second service request may be sent automatically after the selection of the facility to be provisioned is made. In some instances, the second service request may be sent by pressing a physical or virtual button corresponding to the sending request operation. In some implementations, the second service request may be sent after the mobile device user releases the screen or button to disengage from the facility selection mode.

At 450, a phone is picked up to confirm the claiming of the facility. Based on receiving the second service request, the resource management system may send instruction(s) to ring a phone associated with the facility or using other signal to alert the mobile device user for a confirmation of the facility selection. The mobile device user may confirm reservation of or "hoteling" the facility by picking up the phone or interrupt any alert signal. In some implementations, multiple phones associated with multiple facilities may be rung, the mobile device user may pick up any one of the phones to hotel the associated facility.

At 460, a third service request is sent for powering off the facility (or relinquishing control of the facility following the conclusion of the use). When the mobile device user has finished using the facility, he/she may send a third service request to power off the facility. The third service request may be sent using a mobile device application the same with or different from the application used for sending the first and/or second service request. The third service request may be sent by pushing a physical or virtual button corresponding to the powering off request. In some implementations, the mobile device includes a sensor, the mobile device user may approach the facility he/she wants to power off by "wanding" the mobile device towards the facility. The sensor may be a sensor 290 described in the illustration of FIG. 2. For example, the sensor may be a gyroscope that may be used to track/record particular motions based on the movement of the mobile device. In some implementations, "wanding" may be a particular motion performed by a mobile device user with the mobile device. With the help of the sensor, "wanding" may be used to indicate that the particular motion been recorded, and indicate that a particular action with regards to the facility may be performed based on the recorded motion. For example, a first motion may correspond to an indication of reserving a workspace, a second motion may correspond to an indication of turning on lights, and a third motion may correspond to an indication of setting up an IP phone. Similar to selecting the facility at 430, the mobile device user may engage the mobile device in a facility powering off mode by pressing the screen or a button of the mobile device while "wanding" the mobile device towards the facility with a particular motion.

Figure 5:
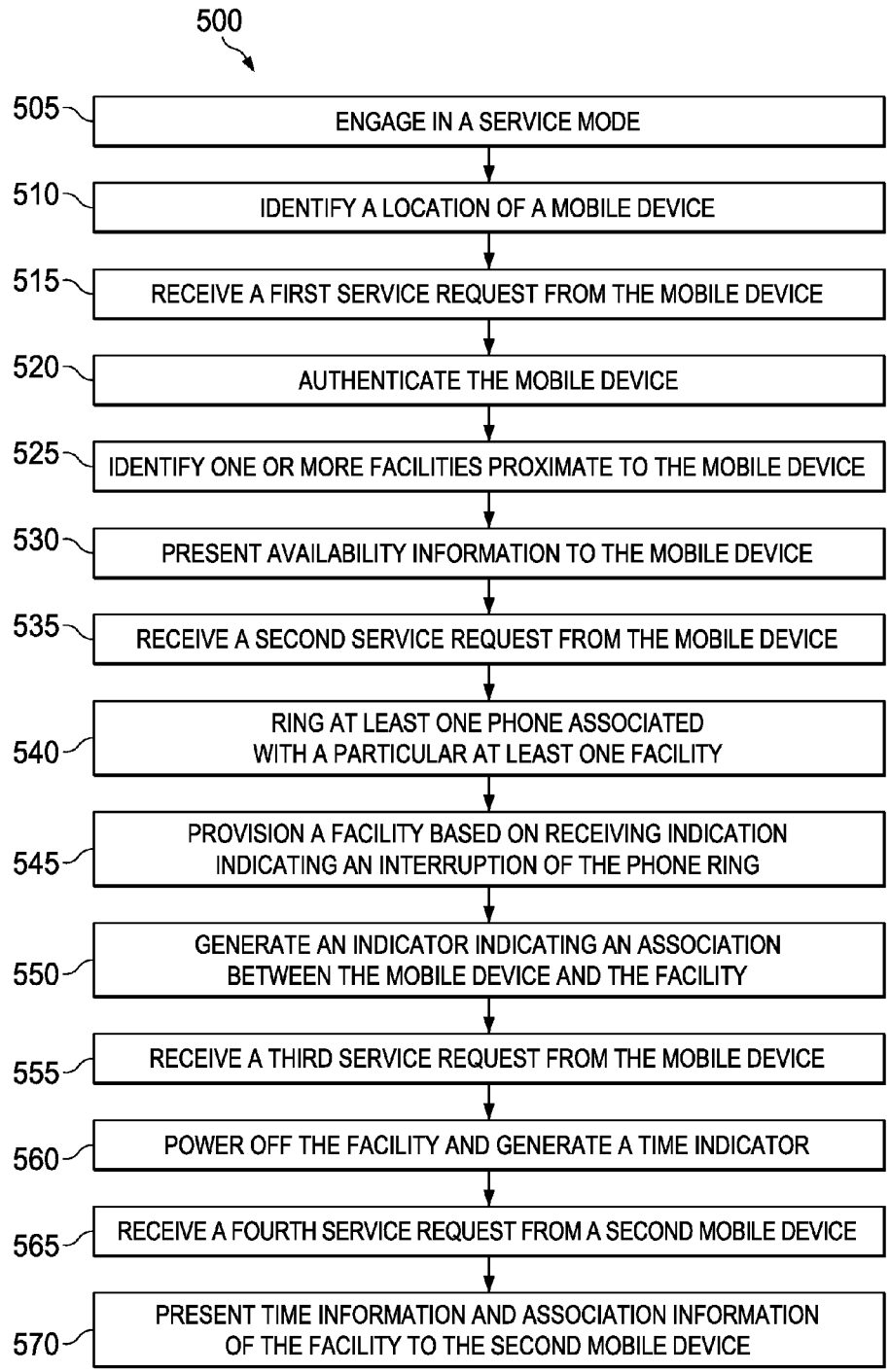
FIG. 5 is a flowchart of a process by which a facility provisions one or more services.

FIG. 5 is a flowchart of a process 500 by which a facility provisions one or more services. Generally, the operations shown in flow chart 500 may be performed using the system configurations described previously. At a high level, the example 500 includes four high-level processes at the server 150 included in the resource management system 110 as illustrated in FIG. 1: (1) present availability information of facilities to a mobile device based on receive and identify a first service request from a first mobile device; (2) provision a facility based on a second service request from the mobile device; (3) power off the facility based on a third service request from the mobile device; and (4) present information associated with usage of the facility to a second mobile device based on a fourth request from the second mobile device. At 505, the server is engaged in a service mode.

At 510, a physical location associated with a mobile device is identified. The physical location of the mobile device may be identified based on a location identifier (such as the location identifier 270 illustrated in FIG. 2) stored in the mobile device, and the use of the resource management system 110 (illustrated in FIG. 1). In some instances, the physical location may be identified using implementations similar to the implementations described in the illustration of FIG. 1. At 515, a first service request from the mobile device is received. The first service request may be carried by wireless signals detected by the wireless access point (such as the access point 120 illustrated in FIG. 1) and processed by the server 150. In some instances, the wireless signal may be encoded, modulated and up-converted to a frequency band suitable for the wireless communication environment. In such instances, receiving the information includes down-converting, demodulating and decoding the information bearing signal. The first service request may be a request for initiating a facility provisioning service. At 520, the mobile device is authenticated. Based on the first service request or addressing information sent by the mobile device, the identity of the mobile user may be determined. Only mobile users with identities that are authenticated may be provided with the facility provisioning service. At 525, one or more facilities proximate to the mobile device are identified. The resource management system may identify all the facilities that are within a certain range of the physical location of the first mobile device based on using features of the resource management system (e.g., using RF fingerprinng as described in the illustration of FIG. 1). At 530, the availability information of the one or more facilities is presented to the mobile device. In some instances, the availability information may be presented to the mobile device using a user interface described in the illustration of FIG. 3.

At 535, a second service request from the mobile device may be received. The second service request may be a request for provisioning at least one facility of the one or more available facilities proximate to the mobile device. At 540, at least one phone associated with a particular at least one facility is rung. Ringing a phone (i.e., an IP phone) may be used as a confirmation request to the mobile device user. The confirmation request is used for confirming that the facility associated with phone is the facility the mobile device user requested to provision. In some implementations, the server may not generate any confirmation request or it may generate confirmation requests in other forms to serve the same purpose. At 545, a facility is provisioned based on receiving indication indicating an interruption of the phone ring. In some instances, by identifying the phone ring or other indicators, the mobile device user may pick up the phone or sending other confirming signals to claim the facility requested.

At 550, an indicator indicating an association between the mobile device and the facility is generated. The indicator may indicate the identity of the mobile device user, a time the associated facility is claimed, or any other related information without departing from the scope of the disclosure. At 555, a third service request is received from the mobile device. The third service request may be used when the mobile device user has finished using the facility and request to power off the facility. In some instances, the powering off may be temporary, the mobile device user may include a time indication when he/she will resume using the facility. In some implementations, the third service request may be generated by "wanding" the mobile device using a particular motion. At 560, the facility is powered off, and a time indicator is generated. The server may send instructions to power off the facility based on receiving the third service request. A time indictor may be automatically generated by the server to indicate a time when the facility is powered off. In some implementations, a time indictor may be generated to indicate a time when the mobile device will resume using the facility based on the received third service request.

At 565, a fourth service request is received from a second mobile device. The fourth service request may be a request for the time and association information of the powered off facility. At 570, the time information and association information of the facility is presented to the second mobile device. The time information may include times the facility is available and/or unavailable, and the association information may indicate the association of the facility and its previous/current/future users.

FIG. 6 is a schematic illustrating an example display screen 600 of a mobile device displaying location information of facilities and appliances proximate to a provisioned facility. The example user interface 600 may be a user interface of a mobile device application that is the same with the application for presenting the availability information of facilities as illustrated in the description of FIG. 3. In some instances, the user interface 600 may be automated presented on the display of the mobile device after a facility is provisioned for a mobile device user as per instructions of the resource management system. In some instances, the example user interface 600 may be presented in response to a request sent from the mobile device.

In the particular example 600, a floor plan schematic 610 (details not shown) of the building the user of the mobile device is located in is shown on the user interface as a background. The floor plan schematic 610 may be used as a reference for the user to identify the direction of the facilities and/or appliances in proximity. The current location 620 of the mobile device and the relative positions of the facilities and/or appliances may be shown as overlays of the floor plan schematic 610. The facilities and appliances that are registered to the resource management system may be listed 630 for the selection of the mobile device user. In this particular example 600, the facilities and appliances are listed as a legend 630. In certain implementations, the facilities and applications may be listed in other kinds of user interface windows. Facilities listed in the legend 630 include lounge, cafeteria, restroom, file room and gym. Appliances listed in the legend 630 include printer, fax machine, copier, projector and server. In some implementations, the facilities and/or appliances may include less or more elements compared to the elements shown in the legend 630. In other implementations, other objects besides facilities and appliances may be shown based on the type of resources managed by the resource management system. In some implementations, the directions to all registered facilities and appliances may be automatically shown on the user interface 600. In the illustrated implementation, directions to only the facilities and appliances selected by the mobile device user are shown. The selected facilities and appliances are shown with a check mark to the right of the particular facility or appliance. In certain implementations, the facilities and/or appliances may be selected by the mobile device user by pressing the display screen if the display screen is a touch screen, using keypad or push buttons that may be included in the mobile device. In the illustrated implementation, a restroom, a gym, a printer and a copier are selected by the mobile device user. Arrows are used to illustrate the relative positions of the facilities and appliances to the mobile device. Arrows in dashed lines are used for facilities, and arrows in dashed lines are used for appliances. The identities of the facilities and appliances and their respective distances relative to the mobile device are shown as captions of the particular arrow. It will be understood that other schematic representations suitable for the illustration of the type, relative position and distance of facility and/or appliance may be used in implementations. Returning back to the example 600, one restroom 650 is shown 18 feet away to the northwest of the mobile device, the other restroom 660 is 19 feet away to the southwest of the mobile user, a copier 690 is 27 feet away to the south of the mobile device, a gym is 112 feet away to the southwest of the mobile device, and a printer 680 is 6 feet away to the northeast of the mobile device. In some instances, the mobile device may include a sensor such as the sensor described in the illustration of FIG. 2, a digital compass 640 that describes the geometric orientations may be shown on the user interface 600 as a guidance for the mobile device user to locate the selected facilities and/or appliances.

While this specification contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems may generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based, at least in part, on one or more other items or operations and may be based exclusively, partially, primarily, secondarily, directly, or indirectly on the one or more other items or operations.

A number of implementations have been described. Nevertheless, it will be understood that various modifications may be made without departing from the spirit and scope of the disclosure. Accordingly, other implementations are within the scope of the following claims.

What is claimed is:

1. A method for provisioning a facility, the method comprising:
   receiving information from a wireless access point communicably coupled to a mobile device;
   identifying a location of the mobile device based on the information received from the wireless access point;
   determining, based on the identified location of the mobile device and receiving a first service request from the mobile device, one or more facilities proximate to the mobile device;
   identifying an availability of the one or more facilities;
   engaging access to information descriptive of the identified availability of the one or more facilities by the mobile device;
   receiving, from the mobile device, a second service request for provisioning a facility among the one or more facilities based on the presented information;
   instructing the facility to generate a signal for a provisioning confirmation;
   receiving, from the facility, an indication indicating the provisioning confirmation;
   provisioning the facility based on receiving the indication;
   receiving, from the mobile device, a third service request for powering off the facility;
   receiving information descriptive of movement of the mobile device that is generated based on a sensor included in the mobile device;
   identifying the third service request based on the received information descriptive of movement of the mobile device; and
   powering off the facility based on the identified third service request.

2. The method of claim 1, further comprising identifying the facility for provisioning based on the received information descriptive of movement of the mobile device.

3. The method of claim 1, further comprising:
   generating an indicator that indicates a time when the facility is powered off; and
   presenting the time to a second mobile device based on a fourth service request.

4. The method of claim 1, wherein indicating the facility includes sending an instruction to ring a phone associated with the facility, and the provisioning confirmation further includes an interruption of a ringing of the phone.

5. The method of claim 1, further comprising:
   indicating the one or more facilities to ring one or more phones associated with the one or more facilities;
   receiving, from a particular one of the one or more facilities, an indication indicating an interruption of a ringing of a phone associated with the particular one of the one or more facilities; and
   provisioning the particular one of the one or more facilities based on receiving the indication.

6. The method of claim 1, wherein the facility is a workspace, and provisioning the facility includes powering on one or more electronic devices of the workspace.

7. The method of claim 1, further comprising presenting to the mobile device one or more time indicators, each of the one or more time indicators associated with a particular one of the one or more facilities that describes a time when the particular one of the one or more facilities is available to be used.

8. The method of claim 1, further comprising:
   generating an indicator that indicates an association of the facility and the mobile device after provisioning the facility;
   receiving a fourth service request from the mobile device; and
   presenting the indicator to a second mobile device based on receiving the fourth service request.

9. The method of claim 1, further comprising:
   receiving a fourth service request;
   determining a location of at least one of the facility or an appliance that is proximate to the facility; and
   presenting to the mobile device, information descriptive of the location of the at least one of the facility or the appliance.

10. A system for provisioning a facility, the system comprising:
    at least one wireless access point;
    a database; and
    a server operable to perform operations including:
       receiving information from a wireless access point communicably coupled to a mobile device;
       identifying a location of the mobile device based on the information received from the wireless access point;
       determining, based on the identified location of the mobile device and receiving a first service request from the mobile device, one or more facilities proximate to the mobile device;
       identifying an availability of the one or more facilities;
       engaging access to information descriptive of the identified availability of the one or more facilities by the mobile device;
       receiving, from the mobile device, a second service request for provisioning a facility among the one or more facilities based on the presented information;
       instructing the facility to generate a signal for a provisioning confirmation;
       receiving, from the facility, an indication indicating the provisioning confirmation;
       provisioning the facility based on receiving the indication;
       receiving, from the mobile device, a third service request for powering off the facility;
       receiving information descriptive of movement of the mobile device that is generated based on a sensor included in the mobile device;

identifying the third service request based on the received information descriptive of movement of the mobile device; and powering off the facility based on the identified third service request.

11. The system of claim 10, further comprising identifying the facility for provisioning based on the received information descriptive of movement of the mobile device.

12. The system of claim 10, further comprising:
generating an indicator that indicates a time when the facility is powered off; and
presenting the time to a second mobile device based on a fourth service request.

13. The system of claim 10, wherein indicating the facility includes sending an instruction to ring a phone associated with the facility, and the provisioning confirmation further includes an interruption of a ringing of the phone.

14. The system of claim 10, further comprising:
indicating the one or more facilities to ring one or more phones associated with the one or more facilities;
receiving, from a particular one of the one or more facilities, an indication indicating an interruption of a ringing of a phone associated with the particular one of the one or more facilities; and
provisioning the particular one of the one or more facilities based on receiving the indication.

15. The system of claim 10, further comprising presenting to the mobile device one or more time indicators, each of the one or more time indicators associated with a particular one of the one or more facilities that describes a time when the particular one of the one or more facilities is available to be used.

16. The system of claim 10, further comprising:
generating an indicator that indicates an association of the facility and the mobile device after provisioning the facility;
receiving fourth service request from the mobile device; and
presenting the indicator to a second mobile device based on receiving the fourth service request.

17. The system of claim 10, further comprising:
receiving a fourth service request;
determining a location of at least one of the facility or an appliance that is proximate to the facility; and
presenting to the mobile device, information descriptive of the location of the at least one of the facility or the appliance.

18. An apparatus comprising:
a processor, the processor operable to execute instructions to:
receive information from a wireless access point communicably coupled to a mobile device;
identify a location of the mobile device based on the information received from the wireless access point;
determine, based on the identified location of the mobile device and receiving a first service request from the mobile device, one or more facilities proximate to the mobile device;
identify an availability of the one or more facilities;
engage access to information descriptive of the identified availability of the one or more facilities by the mobile device;
receive, from the mobile device, a second service request for provisioning a facility among the one or more facilities based on the presented information;
instruct the facility to generate a signal for a provisioning confirmation;

receive, from the facility, an indication indicating the provisioning confirmation;
provision the facility based on receiving the indication;
receive, from the mobile device, a third service request for powering off the facility;
receive information descriptive of movement of the mobile device that is generated based on a sensor included in the mobile device;
identify the third service request based on the received information descriptive of movement of the mobile device; and
power off the facility based on the identified third service request.

19. A method for provisioning a facility, the method comprising:
receiving information from a wireless access point communicably coupled to a mobile device;
identifying a location of the mobile device based on the information received from the wireless access point;
determining, based on the identified location of the mobile device and receiving a first service request from the mobile device, one or more facilities proximate to the mobile device;
identifying an availability of the one or more facilities;
engaging access to information descriptive of the identified availability of the one or more facilities by the mobile device;
receiving, from the mobile device, a second service request for provisioning a facility among the one or more facilities based on the presented information;
instructing the facility to generate a signal for a provisioning confirmation;
receiving, from the facility, an indication indicating the provisioning confirmation;
provisioning the facility based on receiving the indication;
indicating the one or more facilities to ring one or more phones associated with the one or more facilities;
receiving, from a particular one of the one or more facilities, an indication indicating an interruption of a ringing of a phone associated with the particular one of the one or more facilities; and
provisioning the particular one of the one or more facilities based on receiving the indication.

20. A method for provisioning a facility, the method comprising:
receiving information from a wireless access point communicably coupled to a mobile device;
identifying a location of the mobile device based on the information received from the wireless access point;
determining, based on the identified location of the mobile device and receiving a first service request from the mobile device, one or more facilities proximate to the mobile device;
identifying an availability of the one or more facilities;
engaging access to information descriptive of the identified availability of the one or more facilities by the mobile device;
receiving, from the mobile device, a second service request for provisioning a facility among the one or more facilities based on the presented information;
instructing the facility to generate a signal for a provisioning confirmation;
receiving, from the facility, an indication indicating the provisioning confirmation;
provisioning the facility based on receiving the indication;

generating an indicator that indicates an association of the facility and the mobile device after provisioning the facility;

receiving a third service request from the mobile device; and presenting the indicator to a second mobile device based on receiving the third service request.

21. A method for provisioning a facility, the method comprising:

receiving information from a wireless access point communicably coupled to a mobile device;

identifying a location of the mobile device based on the information received from the wireless access point;

determining, based on the identified location of the mobile device and receiving a first service request from the mobile device, one or more facilities proximate to the mobile device;

identifying an availability of the one or more facilities;

engaging access to information descriptive of the identified availability of the one or more facilities by the mobile device;

receiving, from the mobile device, a second service request for provisioning a facility among the one or more facilities based on the presented information;

instructing the facility to generate a signal for a provisioning confirmation;

receiving, from the facility, an indication indicating the provisioning confirmation;

provisioning the facility based on receiving the indication;

receiving a third service request;

determining a location of at least one of the facility or an appliance that is proximate to the facility; and presenting to the mobile device, information descriptive of the location of the at least one of the facility or the appliance.

* * * * *

UNITED STATES PATENT AND TRADEMARK OFFICE
CERTIFICATE OF CORRECTION

PATENT NO. : 8,588,809 B2
APPLICATION NO. : 13/165123
DATED : November 19, 2013
INVENTOR(S) : Seavey et al.

It is certified that error appears in the above-identified patent and that said Letters Patent is hereby corrected as shown below:

In the Specification

In column 12, line 62, please replace:
"fingerprinng" with "fingerprinting"

Signed and Sealed this
Twenty-fifth Day of August, 2015

Michelle K. Lee
*Director of the United States Patent and Trademark Office*